US011803510B2

(12) United States Patent
Gentile et al.

(10) Patent No.: US 11,803,510 B2
(45) Date of Patent: Oct. 31, 2023

(54) LABELING SOFTWARE APPLICATIONS RUNNING ON NODES OF A DATA CENTER

(71) Applicant: International Business Machines Corporation, Armonk, NY (US)

(72) Inventors: Anna Lisa Gentile, San Jose, CA (US); Chad Eric DeLuca, Morgan Hill, CA (US); Petar Ristoski, San Jose, CA (US); Linda Ha Kato, San Jose, CA (US); Alfredo Alba, Morgan Hill, CA (US); Daniel Gruhl, San Jose, CA (US); Steven R. Welch, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 16/786,744

(22) Filed: Feb. 10, 2020

(65) Prior Publication Data
US 2021/0248105 A1     Aug. 12, 2021

(51) Int. Cl.
*G06F 16/11* (2019.01)
*G06F 16/17* (2019.01)
*G06F 18/214* (2023.01)
*G06F 16/182* (2019.01)
*G06N 3/045* (2023.01)

(52) U.S. Cl.
CPC ............ *G06F 16/11* (2019.01); *G06F 16/128* (2019.01); *G06F 16/1734* (2019.01); *G06F 16/182* (2019.01); *G06F 18/214* (2023.01); *G06N 3/045* (2023.01)

(58) Field of Classification Search
CPC ... G06F 16/128; G06F 16/182; G06F 16/1734
See application file for complete search history.

(56) References Cited

U.S. PATENT DOCUMENTS

| | | | | |
|---|---|---|---|---|
| 9,696,940 | B1* | 7/2017 | Neumann | ............. G06F 3/0604 |
| 9,792,160 | B2 | 10/2017 | Shear et al. | |
| 10,324,806 | B1 | 6/2019 | Kucherov et al. | |
| 10,338,913 | B2 | 7/2019 | Franchitti | |
| 2009/0319533 | A1* | 12/2009 | Tengli | .................. G06F 16/338 |
| | | | | 707/999.01 |

(Continued)

FOREIGN PATENT DOCUMENTS

EP         2180422 A1 *  4/2010    ............ G06F 16/113

OTHER PUBLICATIONS

Grossman et al., "The Open Cloud Testbed: A Wide Area Testbed for Cloud Computing Utilizing High Performance Network Services," University of Chicago, Jul. 2009, 7 pages.

(Continued)

*Primary Examiner* — Kannan Shanmugasundaram
(74) *Attorney, Agent, or Firm* — Zilka-Kotab, P.C.

(57) ABSTRACT

A computer-implemented method according to one embodiment includes receiving snapshot data for a node within a data center; determining one or more candidate labels for one or more software applications running on the node, utilizing the snapshot data; implementing a validation of the one or more candidate labels to determine one or more validated labels; and training a machine learning model, utilizing the one or more validated labels and the snapshot data.

20 Claims, 6 Drawing Sheets

(56) References Cited

U.S. PATENT DOCUMENTS

| | | | | |
|---|---|---|---|---|
| 2010/0205421 | A1* | 8/2010 | Campbell | G06F 9/441 |
| | | | | 711/E12.001 |
| 2015/0213365 | A1* | 7/2015 | Ideses | H04L 67/125 |
| | | | | 706/12 |
| 2015/0324434 | A1* | 11/2015 | Greenwood | G06F 16/9566 |
| | | | | 707/722 |
| 2019/0065470 | A1* | 2/2019 | Matthews | G06F 40/284 |
| 2019/0303118 | A1* | 10/2019 | Avinash Dorle | G06F 16/287 |
| 2019/0392354 | A1* | 12/2019 | Yang | G06N 5/04 |
| 2020/0128104 | A1* | 4/2020 | Bitterfeld | G06F 16/906 |
| 2020/0159644 | A1* | 5/2020 | Beltran | G06F 11/3636 |

OTHER PUBLICATIONS

Quintero et al., "Implementing the IBM General Parallel File System (GPFS) in a Cross-Platform Environment," IBM Redbooks, Jun. 2011, 426 pages.

Sidhu, R., "Machine Learning Based Datacenter Monitoring Framework," Thesis, The University of Texas at Arlington, Dec. 2016, 58 pages.

Huang et al., "Snapshot Ensembles: Train 1, Get M for Free," ICLR, 2017, pp. 1-14.

Anonymous, "Augmented Reality Interface for Visualizing and Interacting with IoT Devices," IP.com Prior Art Database, Technical Disclosure No. IPCOM000255233D, Sep. 11, 2018, 22 pages.

Anonymous, "Network Visualization Tool Using 3D Visual Diagrams to Describe Virtual Network Functions," IP.com Prior Art Database, Technical Disclosure No. IPCOM000248148D, Nov. 1, 2016, 21 pages.

Anonymous, "Processing and Transforming Collected Data for Improved Visualization," IP.com Prior Art Database, Technical Disclosure No. IPCOM000232510D, Nov. 14, 2013, 16 pages.

Anonymous, "Method for gradual visualization of data paths of complex networks," IP.com Prior Art Database, Technical Disclosure No. IPCOM000205637D, Apr. 1, 2011, 9 pages.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

Awad et al., "Automatic Workload Characterization Using System Log Analysis," Proceedings 2015 Computer Measurement Group Conf., Nov. 3-5, 2015, pp. 1-11.

Benson et al., "Network Traffic Characteristics of Data Centers in the Wild," Proceedings of the 10th ACM SIGCOMM Conference on Internet Measurement, Nov. 2010, 14 pages.

Benzadri et al., "Towards a Formal Model for Cloud Computing," International Conference on Service-Oriented Computing, 2013, pp. 381-393.

Bernstein et al., "Using Semantic Web Ontology for Intercloud Directories and Exchanges," Proceedings of the 2010 International Conference on Internet Computing, 2010, 7 pages, retrieved from https://pdfs.semanticscholar.org/c450/a1c98d18c6538fbfe0d9795f8787cb57e877.pdf.

Bordes et al., "Translating Embeddings for Modeling Multi-relational Data," Advances in Neural Information Processing Systems 26 (NIPS), 2013, pp. 1-9, retrieved from https://papers.nips.cc/paper/5071-translating-embeddings-for-modeling-multi-relational-data.pdf.

Collobert et al., "Natural Language Processing (Almost) from Scratch," Journal of Machine Learning Research, vol. 12, 2011, pp. 2493-2537.

Deng et al., "An Ontology-Based Framework for Model-Driven Analysis of Situations in Data Centers," IEEE International Conference on Services Computing, 2013, 8 pages, retrieved from https://domino.research.ibm.com/library/cyberdig.nsf/papers/F3CZFEF977E9A00A85257C6F005F6F0D/$File/rc25437.pdf.

Deng et al., "An Ontology-Based Framework for Model-Driven Analysis of Situations in Data Centers," RC25437, IBM research paper, Jan. 2, 2014, 9 pages, retrieved from https://domino.research.ibm.com/library/cyberdig.nsf/papers/F3C2FEF977E9A00A85257C6F005F6F0D/$File/rc25437.pdf.

Fayyad et al., From Data Mining to Knowledge Discovery in Databases. AI Magazine, vol. 17, No. 3, 1996, pp. 37-54.

Gentile et al., "Unsupervised Wrapper Induction using Linked Data," K-CAP'13, ACM, 2013, 8 pages.

Alba et al., "Task Oriented Data Exploration with Human-in-the-Loop. A Data Center Migration Use Case." WWW '19 Companion, May 2019, pp. 610-613.

Jiang et al., "Reconstructing Sessions from Data Discovery and Access Logs to Build a Semantic Knowledge Base for Improving Data Discovery," isprs International Journal of Geo-Information, vol. 5, 2016, pp. 1-14.

Kim, Y., "Convolutional Neural Networks for Sentence Classification," Proceedings of the Conference on Empirical Methods in Natural Language Processing (EMNLP), Oct. 2014, pp. 1746-1751.

Lemoudden et al., "Managing Cloud-generated Logs Using Big Data Technologies," International Conference on Wireless Networks and Mobile Communications (WINCOM), 2015, 8 pages.

Liao et al., "A Software Process Ontology and Its Application," Workshop on Semantic Web Enabled Software Engineering, 2005, 10 pages, retieved from https://pdfs.semanticscholar.org/ba3b/7afbf4325b397dd85220dd2eb02c4ae4d669.pdf.

Magoutis et al., "Galapagos: Model-driven discovery of end-to-end application-storage relationships in distributed systems," IBM Journal of Research & Development, vol. 52, 2008, pp. 367-377.

Mavlyutov et al., "Dependency-Driven Analytics: a Compass for Uncharted Data Oceans," 8th Biennial Conference on Innovative Data Systems Research (CIDR), 2016, 6 pages.

Mintz et al., "Distant supervision for relation extraction without labeled data," Proceedings of the 47th Annual Meeting of the ACL and the 4th IJCNLP of the AFNLP, Aug. 2009, pp. 1003-1011.

Nickle et al., "Holographic Embeddings of Knowledge Graphs," Proceedings of the Thirtieth AAAI Conference on Artificial Intelligence, 2016, pp. 1955-1961.

Ristoski et al., "RDF2Vec: RDF Graph Embeddings and Their Applications," Semantic Web, Aug. 2018, 32 pages.

Trouillon et al., "Complex Embeddings for Simple Link Prediction," Proceedings of the 33rd International Conference on Machine Learning, 2016, 10 pages.

Yang et al., "Embedding Entities and Relations for Learning and Inference in Knowledge Bases," arXiv preprint, 2014, pp. 1-13, retrieved from https://arxiv.org/pdf/1412.6575v1.pdf.

Youseff et al., "Toward a Unified Ontology of Cloud Computing," Grid Computing Environments Workshop, 2008, 11 pages, retrieved from https://www.researchgate.net/publication/224367196_Toward_a_Unified_Ontology_of_Cloud_Computing.

GraphQL, "A query language for your API," The GraphQL Foundation, 2020, 7 pages, retrived from https://graphql.org/.

Costabello et al., "Accenture/AmpliGraph: AmpliGraph 1.3.1," zenodo, Mar. 18, 2020, 4 pages, retrieved from https://doi.org/10.5281/zenodo.2595043.

Hand et al., "Principles of Data Mining," MIT Press, 2001, 322 pages.

* cited by examiner

LABELING SOFTWARE APPLICATIONS RUNNING ON NODES OF A DATA CENTER

BACKGROUND

The present invention relates to data analysis, and more particularly, this invention relates to determining an identity of software applications running within nodes of a data center.

Understanding the structure of a data center is crucial for many tasks, including data center maintenance, monitoring, migration, etc. Understanding the data center structure is a complex process that requires the identification of the function of each node, the dependencies among nodes, as well as the relations between larger clusters of nodes, and often requires extracting information from large amounts of logs and making sense of them.

BRIEF SUMMARY

A computer-implemented method according to one embodiment includes receiving snapshot data for a node within a data center; determining one or more candidate labels for one or more software applications running on the node, utilizing the snapshot data; implementing a validation of the one or more candidate labels to determine one or more validated labels; and training a machine learning model, utilizing the one or more validated labels and the snapshot data.

According to another embodiment, a computer program product for labeling software applications running on nodes of a data center includes a computer readable storage medium having program instructions embodied therewith, where the computer readable storage medium is not a transitory signal per se, and where the program instructions are executable by a processor to cause the processor to perform a method including receiving, by the processor, snapshot data for a node within a data center; determining, by the processor, one or more candidate labels for one or more software applications running on the node, utilizing the snapshot data; implementing, by the processor, a validation of the one or more candidate labels to determine one or more validated labels; and training, by the processor, a machine learning model, utilizing the one or more validated labels and the snapshot data.

According to another embodiment, a system includes a processor; and logic integrated with the processor, executable by the processor, or integrated with and executable by the processor, where the logic is configured to receive snapshot data for a node within a data center; determine one or more candidate labels for one or more software applications running on the node, utilizing the snapshot data; implement a validation of the one or more candidate labels to determine one or more validated labels; and train a machine learning model, utilizing the one or more validated labels and the snapshot data.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of labeling software applications running on nodes of a data center.

In one general embodiment, a computer-implemented method includes receiving snapshot data for a node within a data center; determining one or more candidate labels for one or more software applications running on the node, utilizing the snapshot data; implementing a validation of the one or more candidate labels to determine one or more validated labels; and training a machine learning model, utilizing the one or more validated labels and the snapshot data.

In another general embodiment, a computer program product for labeling software applications running on nodes of a data center includes a computer readable storage medium having program instructions embodied therewith, where the computer readable storage medium is not a transitory signal per se, and where the program instructions are executable by a processor to cause the processor to perform a method including receiving, by the processor, snapshot data for a node within a data center; determining, by the processor, one or more candidate labels for one or more software applications running on the node, utilizing the snapshot data; implementing, by the processor, a validation of the one or more candidate labels to determine one or more validated labels; and training, by the processor, a machine learning model, utilizing the one or more validated labels and the snapshot data.

In another general embodiment, a system includes a processor; and logic integrated with the processor, executable by the processor, or integrated with and executable by the processor, where the logic is configured to receive snapshot data for a node within a data center; determine one or more candidate labels for one or more software applications running on the node, utilizing the snapshot data; implement a validation of the one or more candidate labels to determine one or more validated labels; and train a machine learning model, utilizing the one or more validated labels and the snapshot data.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
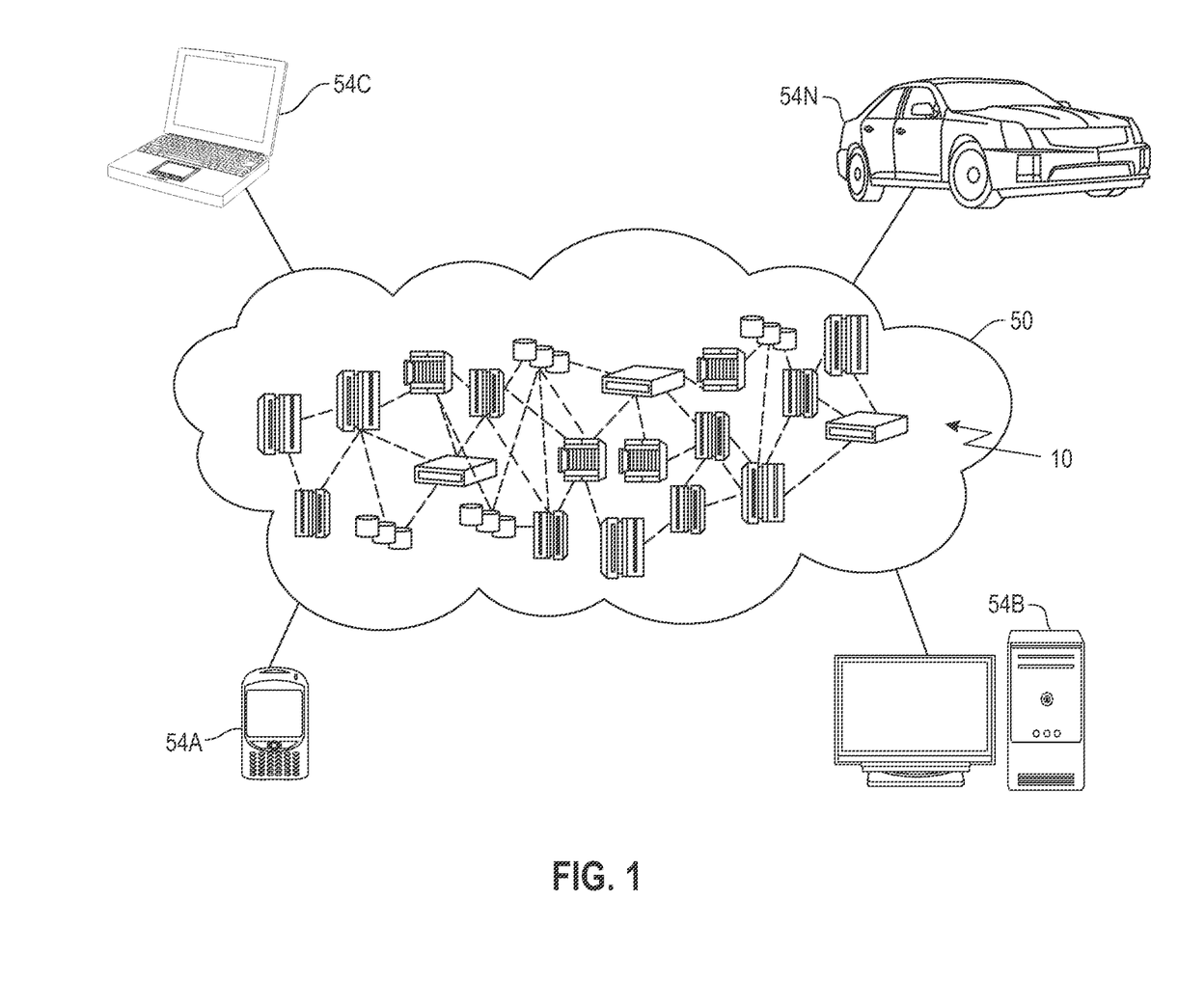
FIG. 1 depicts a cloud computing environment in accordance with one embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
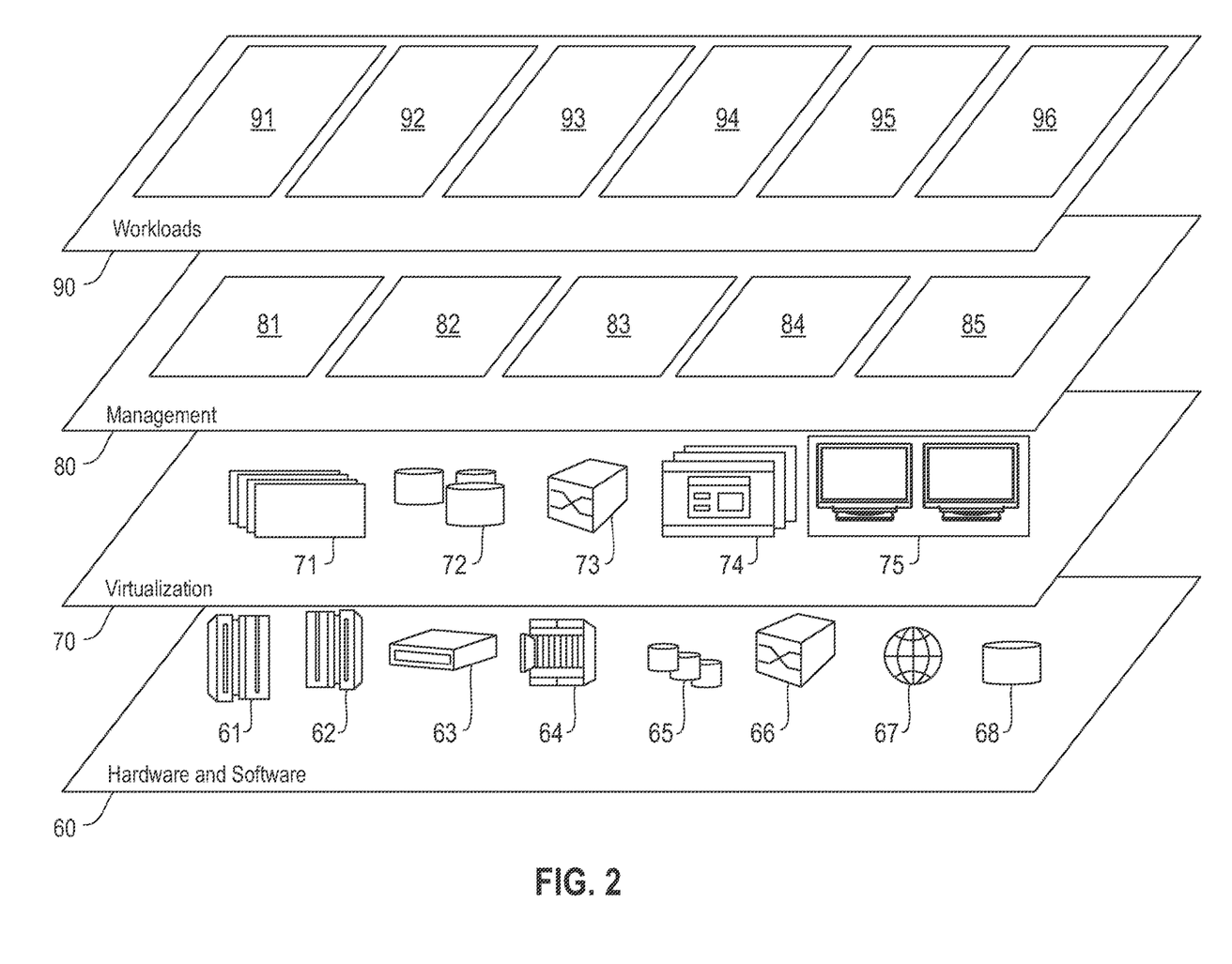
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data migration 96.

Figure 3:
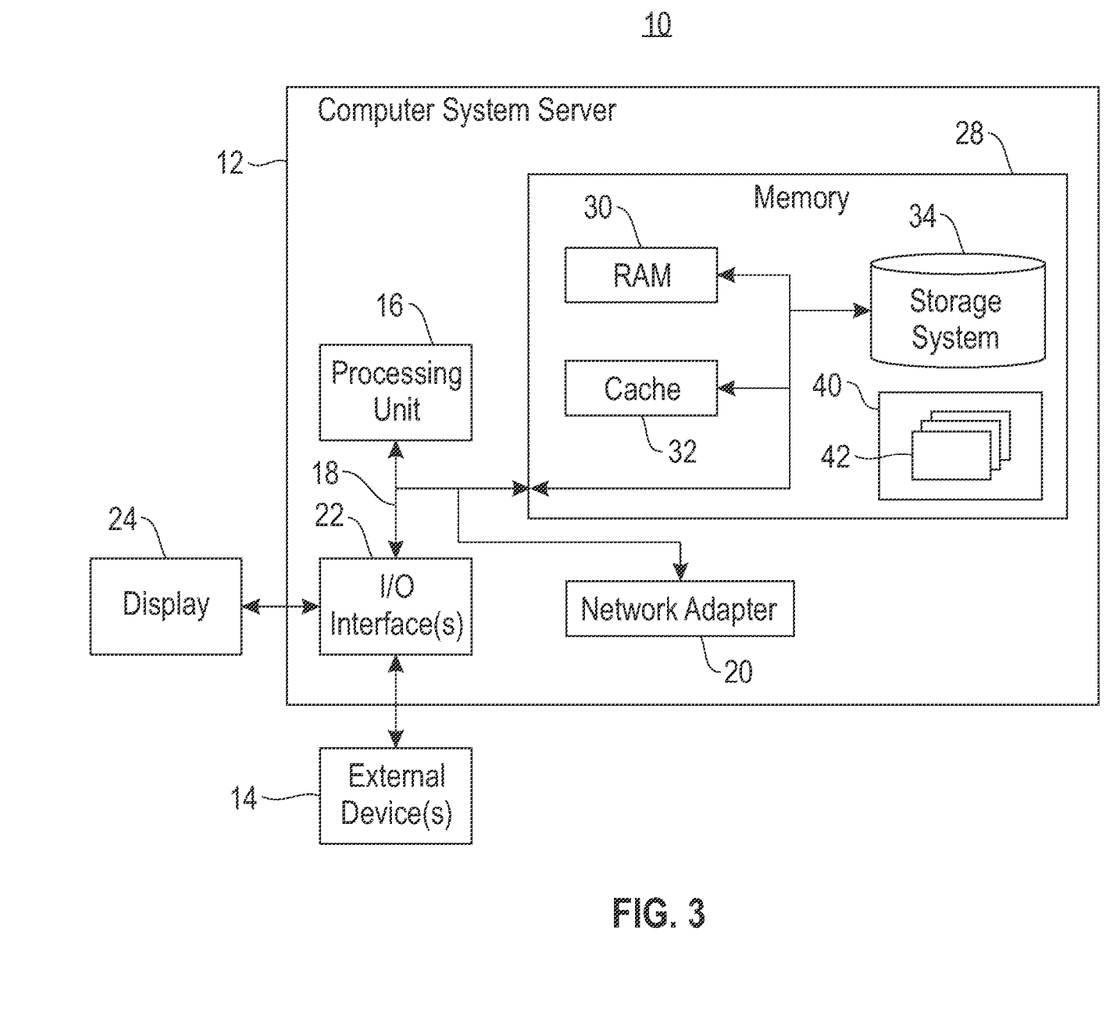
FIG. 3 depicts a cloud computing node in accordance with one embodiment of the present invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
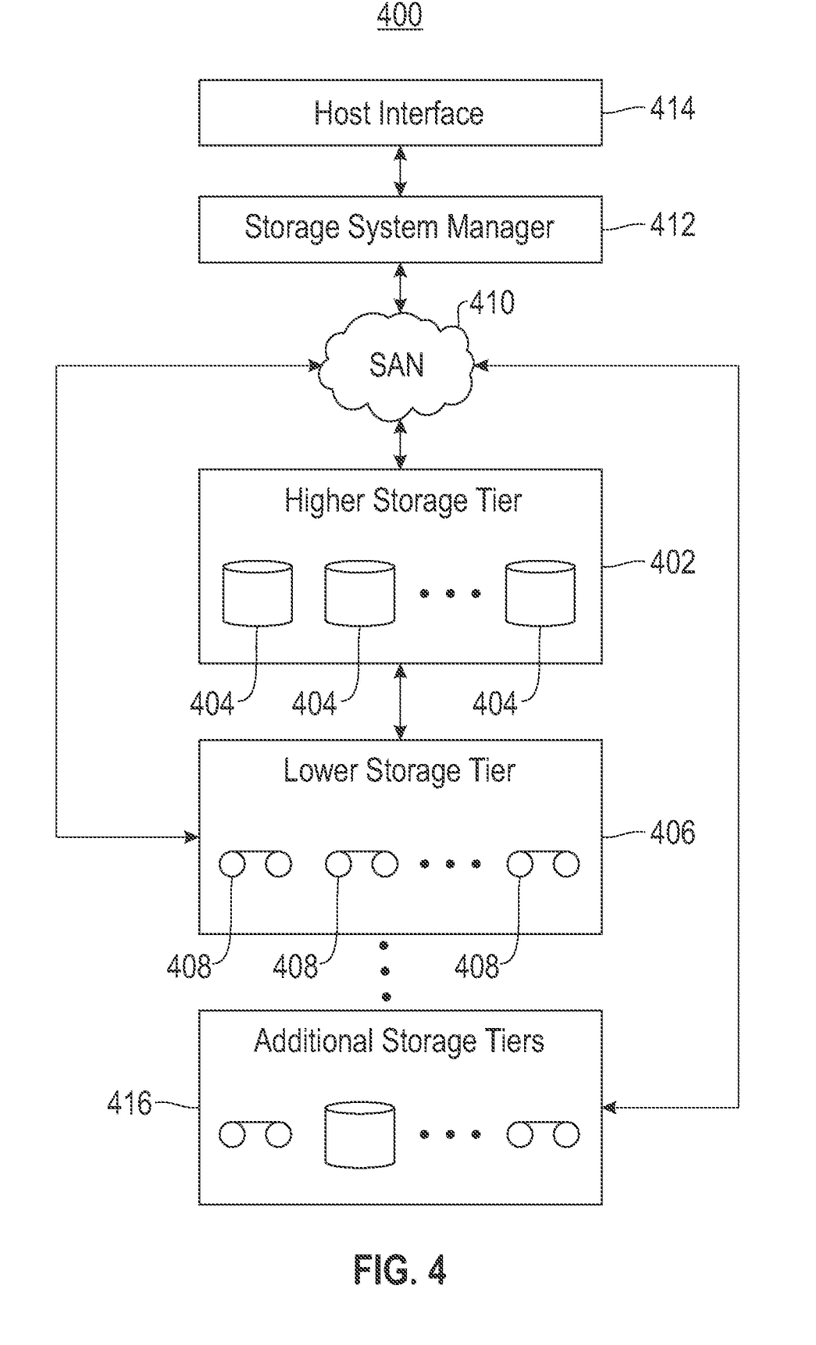
FIG. 4 illustrates a tiered data storage system in accordance with one embodiment of the present invention.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
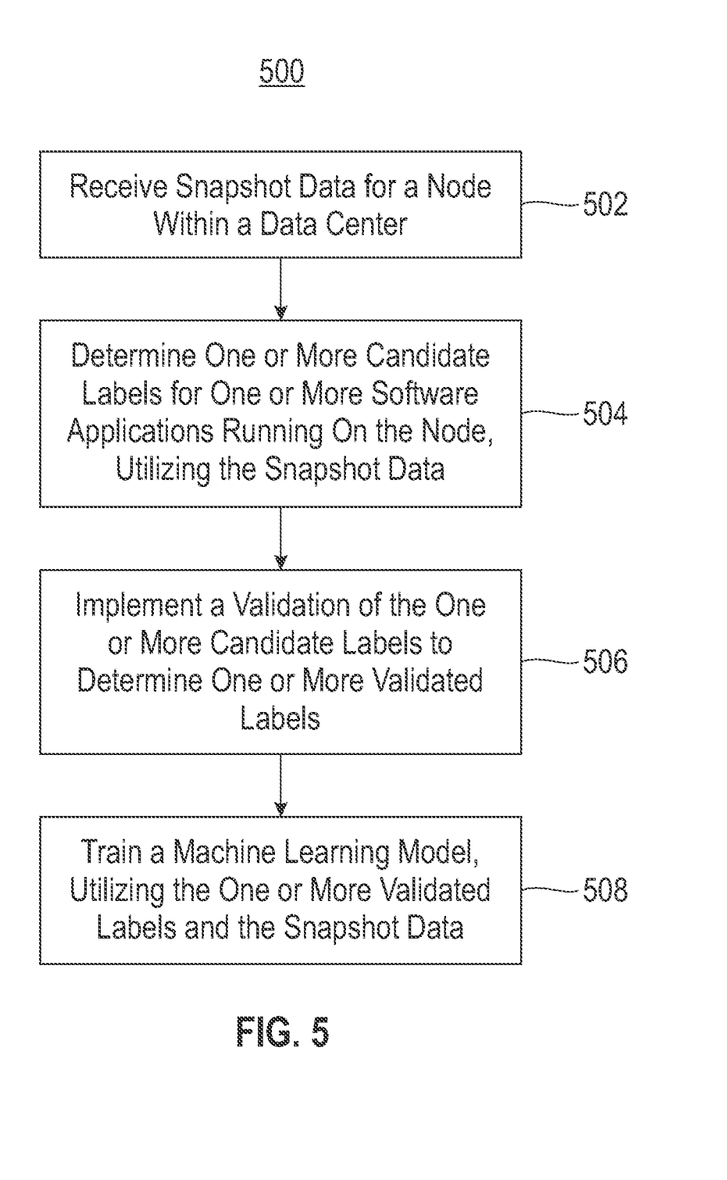
FIG. 5 illustrates a flowchart of a method for labeling software applications running on nodes of a data center, in accordance with one embodiment of the present invention.

Now referring to FIG. 5, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where snapshot data for a node within a data center is received. In one embodiment, the snapshot data may be obtained by running one or more scripts within the node. In another embodiment, the one or more scripts may run according to a predefined schedule.

Additionally, in one embodiment, the snapshot data may include details of one or more actions that are performed within the node identified by the one or more scripts while the one or more scripts are running. For example, the details of the one or more actions may include names of data and folders accessed by one or more applications within the node, names of one or more executables run within the node, etc. In another example, the details of the one or more actions may include an identification of an operating system running within the node.

Further, in one example, the details of the one or more actions may include names of hardware used within the node. In another example, the details of the one or more actions may include names of one or more network interfaces used within the node, one or more relationships the node has with one or more nodes, etc. In yet another example, the snapshot data may include one or more textual strings identifying all at least a portion of the above details.

In still another example, the snapshot data may include metadata identifying at least a portion of the above details.

Further still, in one embodiment, snapshot data may be determined for a plurality of nodes within the data center. For example, snapshot data may be determined for a predetermined percentage of a total number of nodes within the data center. In another embodiment, the node may include a physical node (e.g., containing physical hardware, etc.), a virtual node, etc.

Also, in one embodiment, the data center may include a plurality of physical and/or virtual nodes that perform one or more calculations and/or operations on data. For example, the operations may include one or more of data processing/manipulation, data storage, data analysis, etc.

In addition, method 500 may proceed with operation 504, where one or more candidate labels are determined for one or more software applications running on the node, utilizing the snapshot data. In one embodiment, determining the one or more candidate labels may include constructing a term dictionary. For example, the term dictionary may include names of existing applications that are able to be run within the node.

Furthermore, in one example, one or more resources (e.g., application name databases, knowledge bases, open data clouds, etc.) may be identified and parsed to determine a plurality of software application names. In another example, software application names may be compiled from across a plurality of available resources to create the term dictionary. In still another example, term dictionary may include a list of application names. In yet another example, application names within the term dictionary may include names of software applications that have been retrieved from publicly available resources.

Further still, in one embodiment, a software application may include a commercially available (or custom) process that may be run on the node. For example, the software application may access and/or manipulate data on the node, store and/or retrieve data on the node, etc. In another example, the software application may be installed on the node.

Also, in one embodiment, determining the one or more candidate labels may include comparing the term dictionary to the snapshot data. For example, a similarity check may be performed between the term dictionary and strings found within the snapshot data. For instance, performing the similarity check may include performing a string similarity operation between each element of the term dictionary and each string within the snapshot data.

Additionally, in one example, terms within the term dictionary that have a determined similarity value to one or more strings within the snapshot data that exceeds a predetermined threshold may be identified as candidate labels for one or more software applications running on the node.

Further, method 500 may proceed with operation 506, where a validation of the one or more candidate labels is implemented to determine one or more validated labels. In one embodiment, the one or more candidate labels may be sent with the associated snapshot data to be validated. In another embodiment, validation may include confirmation whether the one or more candidate labels correctly identify software applications running on the node for which the snapshot data was created.

Further still, in one embodiment, validation may be performed manually (e.g., by one or more experts), automatically (e.g., by a neural network, etc.), etc. In another embodiment, the validated labels may include candidate labels that are confirmed to be an accurate label for an application running on the node when the snapshot data was obtained for the node.

Also, method 500 may proceed with operation 508, where a machine learning model is trained utilizing the one or more validated labels and the snapshot data. In one embodiment, the machine learning model may include one or more neural networks. In another embodiment, the machine learning model may include a classification model.

In addition, in one embodiment, training the machine learning model may include inputting the one or more validated labels and associated snapshot data as training data into the machine learning model. For example, the one or more validated labels and associated snapshot data may be used as training data to train the machine learning model to take input snapshot data and output labels of applications running within the node when the snapshot data was obtained within the node.

Furthermore, in one embodiment, during the training, the machine learning model may associate information within the snapshot data (e.g., textual strings within the snapshot data, metadata within the snapshot data, etc.) with the validated labels.

Further still, in one embodiment, snapshot data may be obtained for additional nodes within the data center. For example, the snapshot data for the additional nodes within the data center may be input into the trained machine learning model. In another example, the machine learning model may identify one or more labels for the snapshot data for each node.

Also, in one embodiment, the one or more labels may identify one or more software applications that are currently running within nodes of the data center. In another embodiment, the trained machine learning model may determine a confidence score for each of the one or more labels. For example, if the confidence score is below a predetermined threshold value, the associated label may be sent with the associated snapshot data to be validated.

Also, in one embodiment, snapshot data may initially be determined for a predetermined subset of all nodes within the data center. For example, this snapshot data may be analyzed for each of the subset of nodes to determined one or more candidate labels for one or more software applications running on the subset of nodes. In another example, the candidate labels may be validated, and the validated labels and snapshot data for each of the subset of nodes may be used as training data to train the machine learning model. In yet another example, snapshot data for the remaining nodes within the data center (e.g., the nodes within the data center other than the predetermined subset) may then be obtained and input into the trained machine learning model to determine labels for software applications running within the other nodes.

Additionally, in one embodiment, each node within the data center may be represented within a visual representation of the data center (e.g., a graph, etc.). In another embodiment, the graph may be presented visually to one or more users. In yet another embodiment, upon identifying a selection of a node within the graph, all applications running on the node may be provided (e.g., as a visual list, etc.). For example, the applications may be the labels of one or more software applications determined to be running on the node, based on the most recent snapshot data for the node. In still another embodiment, upon identifying a selection of a label of a software application, all nodes within the graph for which that label has been identified may be visually presented.

In this way, validated labels for snapshot data of a subset of all nodes within a data center may be used to train a machine learning model that may determine labels for snapshot data of all other nodes within the data center. This may reduce an amount of processing necessary to determine such labels for the nodes in the data center, which may improve a performance of one or more hardware computing devices performing such labelling.

Additionally, the labels may identify which software applications are currently running on all nodes within a data center when snapshot data was obtained for the node. This information may be used to determine nodes for which data migration is to be performed. For example, data associated with a predetermined application may be migrated from nodes within the data center to a data cloud. This information may also be used to determine nodes to be shut down or restarted. For example, a patch may need to be run on nodes running a predetermined application, followed by a restart of those nodes. In another example, one or more predetermined applications may have a high priority, and nodes running those applications may be prevented from being shut down within the data center.

As a result, by knowing which applications are currently running on nodes within the data center, more accurate operations (e.g., migration, etc.) may be performed on those nodes. This may reduce an amount of processing necessary during those operations, and may reduce occurrences of unplanned outages during the operations, which may improve a performance of one or more hardware computing device implementing those operations.

Understanding Data Centers from Logs: Leveraging External Knowledge for Distant Supervision Understanding the functions implemented within a data center (e.g., which software processes are running, where the software processes are running, etc.) is a challenging problem, especially in situations were good documentation practices are not in place, and occurrences such as machine reconfigurations, software updates, changing software installation, failures, and malevolent external attacks make the data center ecosystem difficult to understand. When data center migration is offered as a third-party service it is important to enable practitioners to quickly and precisely characterize the nature, role, and connections of the multitude of nodes in the data center.

Migrating data centers (including physically relocating machines or logically moving applications to the cloud) is a time and resource intensive task. Preparing a migration plan (especially in the absence of well documented information about the nature of the data center) involves significant data analysis, and often practitioners have to rely on logs and network activities of each node in the data center to understand its cartography. Discovering and understanding connections and dependencies can be very laborious, and missing any component of a dependency can result in unplanned outages during a migration. Traditional data analysis tools offer little support during the planning phase, which typically requires a significant amount of labor.

In one embodiment, a data exploration solution may allow a subject matter expert (SME) to interactively augment collected data with structured knowledge and semantic information which is not initially present in the data. Information extraction techniques may be combined with human-in-the-loop learning to construct a semantic representation of the functions provided by the data center.

In another embodiment, a semantic representation of a data center may be produced. Knowledge extraction is performed with a human-in-the-loop model by (i) collecting available knowledge about software processes from a Linked Open Data (LOD) cloud, (ii) using the knowledge in a distant supervision fashion to generate initial tags for each node in the data center, (iii) validating (e.g., accepting/rejecting/correcting) the proposed tags, (iv) using the validated tags to train several learning models, and (v) labeling all the processes from each node in the data center, using the trained models. One or more SMEs may validate new annotations and the process can be repeated until desired coverage is obtained.

While for many processes in the data center useful textual information is available (e.g., long process name strings captured from logs), for many others only information about ports, connections, etc. is available, without textual logs. By using all available textual content from those processes with logs, initial tags may be generated using knowledge from the LOD. External knowledge may be effectively used to create tags and bootstrap the annotation process, and the model may be trained using both the textual information as well as the graph structure. The models may then be applied and refined on an entire dataset representing the data center, including nodes where no textual content is available. Also, all the enriched data may be rendered with graph visualization tools. The SMEs may have access to combined information about the nodes' logs, together with iteratively added knowledge, which creates an intelligible cartography of the data center.

A data center may refer to a large, dedicated cluster of computers that is operated by a single organization.

In one embodiment, a data center D is a tuple <H, P, C> where H is a set of hosts (e.g., physical or virtual machines), $P=p_1 \ldots p_n$ is a list of processes running on each host h∈H, and C is a list of directed links between the processes P. Each host h has a set of features s∈S. Each s is a datatype property of the host, such as the operating system, the hardware platform, available network interfaces, etc. Each process p has a set of features d∈D, where each d can be either a datatype property of the process (such as port number, IP address, consumer/service status etc.) or a relational property of the process (such as parent/child/sibling processes within the host). C contains the links between all processes in P, which express a directional relation among them: each process is either a consumer or a provider for another process.

Each data center D can be transformed into a knowledge graph G=(V, E).

In another embodiment, a knowledge graph is a labeled, directed graph G=(V, E) where V is a set of vertices, and E is a set of directed edges, where each vertex v∈V is identified by a unique identifier, and each edge e∈E is labeled with a label from a finite set of link edges.

To transform a given data center D into a knowledge graph G, each process p may be converted into a graph vertex $v_p$. Then, a list of labels is generated for each feature of the existing processes. For each feature of each process a triple is generated in the form $<v_p, e_n, e_p>$, where $e_p$ is the value of the feature for the given process $v_p$. Then we transform the set of links C between all the processes to triples in the form $<v_p, c_n, v_{pi}>$, where each type of link is represented with a set of triples, i.e., one triple for each feature of the link $<v_c, e_n, e_c>$.

Given a data center D=<H, P, C>, one objective may be to use the information provided for each process, and the links to other processes, to assign a set of labels $L_p=l_1, l_2, \ldots, l_n$ to each process p and (by inheritance) to each host h. This task is also known as knowledge graph type prediction.

Collecting the Data

Data is collected by running a script on each machine, virtual or physical, that is deemed important. This may include deploying the script to a predetermined percentage (e.g., 10%-20%, etc.) of the nodes in a data center. The script is executed with parameters that indicate how long the script should run and how often the script should take a snapshot. One exemplary configuration is to run the script for two weeks, taking a data snapshot every fifteen minutes. Upon the first snapshot, the script records attributes considered "static," including operating system, hardware, and network interface information. Every snapshot includes a list of all active connections at that point in time, along with every running process.

An active connection may include a process (e.g., either the consumer or provider or a service), a direction indicator, a target port, and the IP address of the other side of the connection. If the collection script is running on the node at the other side of this connection, both sets of collected data may be combined to construct a full, end-to-end definition of a particular dependency. In cases where the other side of the dependency is not running the collection script, a partial understanding of the dependency may be determined because the exact process communicating on the other node may be unknown.

When running processes are captured, the process log string (which we refer to as process name) may be recorded along with its Process ID (PID) and its Parent Process ID (PPID). These elements allow for the construction of a process tree as it existed when that snapshot was taken. The process tree from each snapshot may be combined into a meta-tree such that, at any point-in-time, the process tree represents a subset of the process meta-tree with all relationships intact. The relationship between processes can be helpful in process identification (e.g., when a particular communicating process is unknown, but its parent is known). In such cases, cascading attributes from a parent process to its children may be beneficial.

All collected data is transformed into a knowledge graph representation, using the methodology described above.

Bootstrapping the Labelling Process: The Knowledge Matcher

This step may create an initial set of candidate labels for the processes in the data center. This task may be addressed as a distant supervision problem, by leveraging pre-existing, structured knowledge to annotate the data center processes. In one embodiment, external knowledge may be used to construct dictionaries for target concepts, which are then used to label the target data. The approach is not bound to any specific ontology or resource; the only assumption is to have a dictionary that contains instances of the target concept. The dictionary does not have to be exhaustive either, as the SME may expand the knowledge with any missing concept.

In one embodiment, a dictionary may be constructed for the concept Software. Given a SPARQL endpoint, the exposed Linked Data may be queried to identify the relevant classes. A subset of classes and properties that describe the concept of interest may be selected, and queries may be crafted to obtain instances of those classes and properties.

FIG. 1 illustrates an exemplary query to find Software on DBpedia, according to one exemplary embodiment.

FIG. 1

```
SELECT (?x AS ?ID) (?l AS ?SoftwareName) (?gl AS ?SoftwareType)
  WHERE {?x a dbo:Software.
    ?x rdfs:label ?l.
    ?x dbo:genre ?g.
    ?g rdfs:label ?gl.
  FILTER (lang(?l) = 'en')
  FILTER (lang(?gl) = 'en')}
```

Similar queries may be run against different Linked Datasets, and the results may be combined in a single dictionary for the concept Software. A vector space representation may be built for this constructed knowledge, where each software item is represented as a tf-idf vector and the vocabulary of features is built using the software names, labels and, optionally, any of the properties which is of text type (e.g. collected features such as the operating system, the type of type of software, etc). A vector space representation may be built of all the processes $p \in P$, and the vocabulary of features may be built using all the text in the collected log strings. Standard cosine similarity may be used to assign one label from the software dictionary to each process $p \in P$. Any annotation with similarity below a certain threshold may be discarded, and for each $p \in P$ the top similar instance may be selected from the dictionary. The annotations produced in this step are not meant to be exhaustive, may be as accurate as possible, as an initial pool of diverse annotations may be created that can be used to train machine learning models.

Human-in-the-Loop: Validation and Knowledge Expansion

In one embodiment, all retained annotations may be ranked by their similarity score. Before presenting the annotations to the SME, they may be clustered using one or more rules. For example, many logs may be very similar to one another (e.g. only a few parameters change, but the commands may be substantially the same) meaning that, in these cases, the SME can validate the proposed annotations in bulk.

During the validation process, if the SME does not accept any of the candidate annotations, they can browse the reference dictionary and manually select the appropriate one (if available). The SME may also be provided the possibility to manually add an entry to the dictionary, if they deem it missing, or delete any dictionary entry that they consider spurious, redundant, or incorrect. All the validated annotations are immediately added as tags for the processes and can be used as exploring dimensions to query and visualize the data.

Training the Models

In one embodiment, the validated tags may be used to train a classification model in order to extend the tags to the whole data center. Many different neural network models may be used (e.g., simple architectures that exploit string information about the text in the logs, graph embeddings that capture all the relations among the nodes in the data center, etc.) For string-based approaches multi-label Logistic Regression (LR), multi-label Support Vector Machines (SVM), and Convolutional Neural Network (CNN) text classifiers may be used that are trained to classify log entries.

In many cases of analyzing data center logs, a significant portion of the processes do not include a name or string description (e.g., either only the process ID is available or the string description is encoded, which cannot be used to infer the label of the process). To be able to correctly label such processes, multiple graph embedding approaches may be used. Graph embedding approaches transform each node in the graph to a low dimensional feature vector. The feature vector embeds the graph characteristics of the node, and such vector may be used to predict the node's label (e.g., similar nodes in the graph may have the same label). To build graph embedding vectors on a data center D, it may be transformed to a knowledge graph G=(V, E). Graph embedding approaches such as RDF2Vec, TransE, DistMult, ComplEx, and HolE may be used. The output of each graph embedding approach is used to build a classification model for node label prediction (e.g., multilabel Logistic Regression, multi-label Support Vector Machines, and CNN networks).

Data Center Explorer

Figure 6:
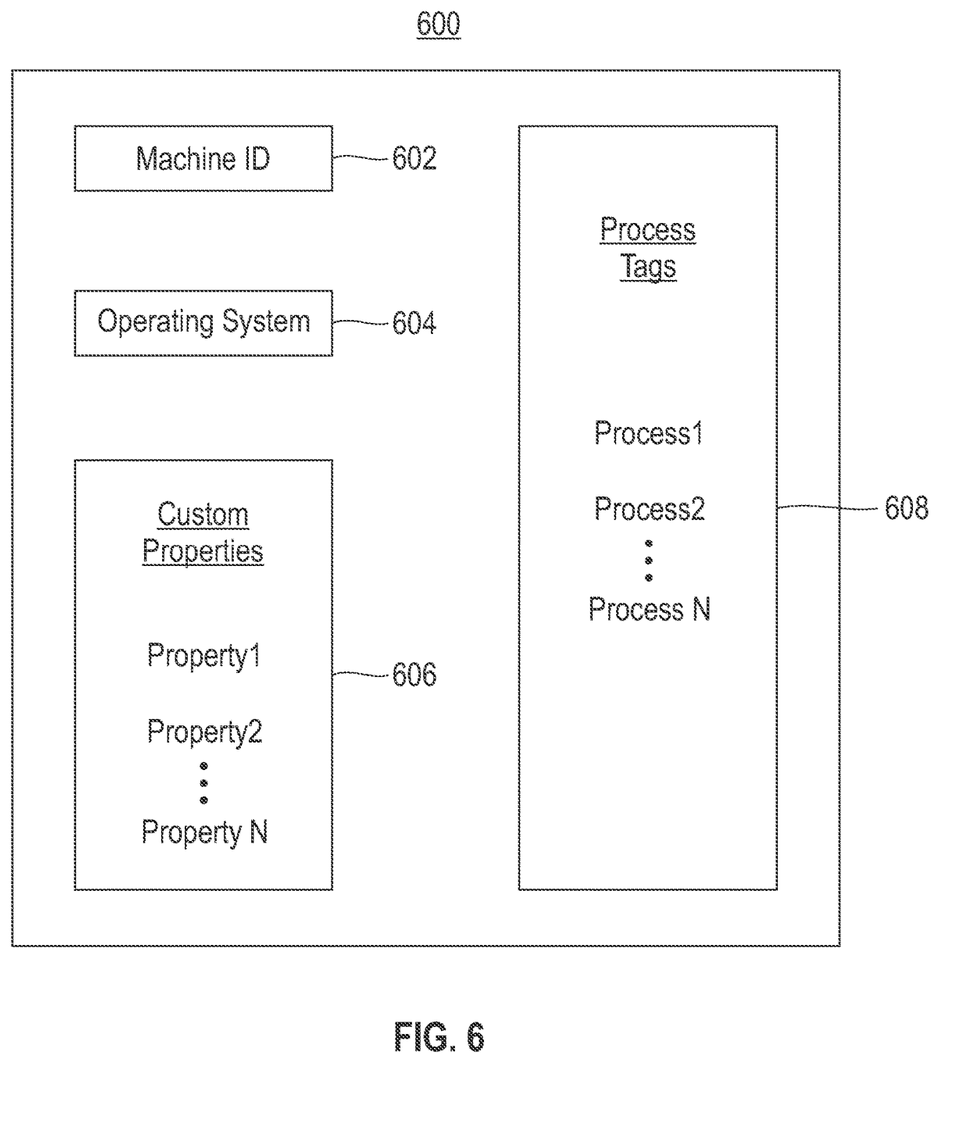
FIG. 6 illustrates an exemplary Knowledge Card for a node in a data center, in accordance with one embodiment of the present invention.

The produced data center graph may be used to feed a Data Center Explorer (DCE) visual tool. All network information is used to build a color-coded representation of all the nodes, as well as their incoming and outgoing connections. Within the produced semantic representation, each node is characterized by all its entities of interest, i.e. the processes running on the machine and their associated tags. A knowledge card may be created for each node that summarizes all the information about the node itself, including all the semantic tags associated with all processes running on the node. FIG. 6 illustrates an exemplary Knowledge Card 600 for a node in a data center, according to one exemplary embodiment. As shown in FIG. 6, the Knowledge Card 600 includes a machine identifier 602, an operation system identifier 604, custom properties 606 determined for the node (e.g., server type, cabinet name, criticality, division, environment, security class, etc.), and a list of processes 608 (e.g., software applications) currently running within the node.

Moreover, all the knowledge collected in the enriched data center graph can be used to query the data center via GraphQL3 queries, as well as using the tags as active facets.

CONCLUSION

A distant supervision approach may be used to understand the structure of a data center. This approach may bootstrap the annotation of logs using knowledge from the Linked Open Data Cloud. Neural models may then be trained and refined with a human-in-the-loop methodology.

In one embodiment, a method of utilizing a computing device to visualize functionality implemented within a data center includes taking by a computing device a snapshot of one or more processes executing on a node of a plurality of nodes; generating by the computing device one or more initial candidate labels for the one or more processes; training by the computing device a classification model based upon the one or more initial candidate labels to finalize the candidate labels for the one or more processes; generating by the computing device a visualization of the plurality of nodes, the visualization of the plurality of nodes displaying, at least, the plurality of nodes, the one or more processes executing, and the finalized candidate labels; and displaying the visualization to a user.

In another embodiment, the nodes are physical or virtual. In another embodiment, the snapshot is taken by a script executing on each node of the plurality of nodes. In yet another embodiment, the snapshot contains a list of all active connections between nodes present at a time of the snapshot.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving snapshot data for a node within a data center;
performing a similarity check between strings within the snapshot data and elements of a term dictionary of applications that are able to be run within the node;
determining, based on the similarity check, candidate labels for a plurality of software applications running on the node;
implementing a validation of the candidate labels to determine one or more validated labels, wherein the validation includes confirmation whether the candidate labels correctly identify the plurality of software applications running on the node for which the snapshot data was created; and
training a machine learning model, utilizing the one or more validated labels and the snapshot data.

2. The computer-implemented method of claim 1, wherein the snapshot data is obtained by running one or more scripts within the node according to a predefined schedule.

3. The computer-implemented method of claim 1, wherein the snapshot data includes details of one or more actions that are performed within the node identified by one or more scripts running within the node.

4. The computer-implemented method of claim 1, wherein the strings are textual strings.

5. The computer-implemented method of claim 1, wherein the node is a physical node that contains physical hardware, and comprising: outputting a visual representation of the data center for display on a user device; receiving selection of a first of the validated labels; and in response to receiving selection of the first of the validated labels, outputting an updated visual representation of the data center that includes nodes running a software application associated with the first of the validated labels.

6. The computer-implemented method of claim 1, comprising: constructing the term dictionary, wherein constructing the term dictionary includes: running queries against different linked datasets, combining results of the queries into the term dictionary, and building a vector space representation based on the results of the queries.

7. The computer-implemented method of claim 1, wherein the snapshot data for the node includes:
   names of data and folders accessed by one or more applications within the node,
   names of one or more executables run within the node, and
   an operating system running within the node.

8. The computer-implemented method of claim 1, wherein:
   the validation is performed automatically by a neural network.

9. The computer-implemented method of claim 1, wherein the machine learning model includes a plurality of neural networks.

10. The computer-implemented method of claim 1, wherein the node is a physical node that contains physical hardware, wherein the snapshot data for the physical node includes: names of hardware used within the physical node.

11. The computer-implemented method of claim 1, further comprising:
   obtaining additional snapshot data for additional nodes within the data center;
   inputting the snapshot data for the additional nodes within the data center into the trained machine learning model;
   identifying one or more labels for the snapshot data for each of the additional nodes, using the machine learning model, where the one or more labels identify one or more software applications that are currently running within the additional nodes of the data center;
   determining a confidence score for each of the one or more labels; and
sending one or more of the labels to be validated in response to determining that the confidence score is below a predetermined threshold value.

12. A computer program product, the computer program product comprising a computer readable storage medium having program instructions embodied therewith, the program instructions executable by a processor to cause the processor to perform a method comprising:
   receiving, by the processor, snapshot data for a single physical node within a data center that includes a plurality of nodes;
   determining, by the processor, one or more candidate labels for one or more software applications running on the single physical node, utilizing the snapshot data;
   implementing, by the processor, a validation of the one or more candidate labels to determine one or more validated labels;
   training, by the processor, a machine learning model, utilizing the one or more validated labels and the snapshot data;
   outputting, by the processor, a visual representation of the data center;
   receiving, by the processor, selection of a first of the validated labels; and
   in response to receiving the selection, outputting, by the processor, an updated visual representation of the data center, wherein the updated visual representation includes all of the nodes of the data center that are running a software application associated with the first validated label.

13. The computer program product of claim 12, wherein the snapshot data is obtained by running one or more scripts within the single physical node.

14. The computer program product of claim 12, wherein the snapshot data includes details of one or more actions that are performed within the single physical node identified by one or more scripts running within the single physical node.

15. The computer program product of claim 14, wherein the single physical node contains physical hardware, wherein the snapshot data for the single physical node includes: names of hardware used within the single physical node.

16. The computer program product of claim 12, wherein determining the one or more candidate labels includes constructing a term dictionary, wherein constructing the term dictionary includes: running queries against different linked datasets, combining results of the queries into the term dictionary, and building a vector space representation based on the results of the queries.

17. The computer program product of claim 12, wherein determining the one or more candidate labels includes comparing a term dictionary to the snapshot data.

18. The computer program product of claim 12, the program instructions executable by the processor to cause the processor to perform the method comprising:
   performing, by the processor, a similarity check between strings within the snapshot data and elements of a term dictionary of applications that are able to be run within the single physical node,
   wherein the candidate labels are determined based on the similarity check.

19. A system, comprising:
   a processor; and
   logic integrated with the processor, executable by the processor, or integrated with and executable by the processor, the logic being configured to:
   construct a term dictionary;
   receive snapshot data for a single physical node within a data center;
   perform a similarity check between process log strings within the snapshot data and elements of a term dictionary of applications that are able to be run within the single physical node;
   determine, based on the similarity check, candidate labels for a plurality of software applications running on the single physical node;
   implement a validation of the candidate labels to determine one or more validated labels, wherein the validation includes confirmation whether the candidate labels correctly identify the plurality of software applications running on the single physical node for which the snapshot data was created; and
   train a machine learning model, utilizing the one or more validated labels and the snapshot data.

20. The system of claim 19, wherein constructing the term dictionary includes: running queries against different linked datasets, combining results of the queries into the term dictionary, and building a vector space representation based on the results of the queries, and the logic being configured to:
   output a visual representation of the data center, wherein the visual representation includes a graph that includes the single physical node and a plurality of other nodes of the data center;

receive selection of a first of the other nodes in the graph; and in response to receiving the selection, output, by the processor, an updated visual representation of the data center that includes a visual list of all applications running on the first other node.

\* \* \* \* \*